(12) United States Patent
Chang

(10) Patent No.: US 7,820,918 B2
(45) Date of Patent: Oct. 26, 2010

(54) SHIELDING CAN AND METHOD FOR MAKING SAME

(75) Inventor: Chia-Hsin Chang, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 315 days.

(21) Appl. No.: 11/955,283

(22) Filed: Dec. 12, 2007

(65) Prior Publication Data

US 2008/0169437 A1 Jul. 17, 2008

(30) Foreign Application Priority Data

Jan. 17, 2007 (CN) .......................... 2007 1 0072863

(51) Int. Cl.
*H05K 9/00* (2006.01)
(52) U.S. Cl. .................. 174/384; 361/816; 174/377
(58) Field of Classification Search ................ 174/377, 174/384; 361/818, 816
See application file for complete search history.

(56) References Cited

U.S. PATENT DOCUMENTS

| 7,310,223 | B2 * | 12/2007 | Xu et al. ................. 361/679.33 |
| 2008/0165489 | A1 * | 7/2008 | Ho et al. ..................... 361/684 |

FOREIGN PATENT DOCUMENTS

| CN | 1512833 A | 7/2004 |
| CN | 2766378 Y | 3/2006 |

* cited by examiner

*Primary Examiner*—Hung V Ngo
(74) *Attorney, Agent, or Firm*—Jeffrey T. Knapp

(57) ABSTRACT

A shielding can (100) includes a shielding case (10) configured to reducing electromagnetic interference, and a cushion (20) integrally mounted to the shielding case by insert molding. The cushion is configured to absorb shock force. A method for making the shielding can includes the following steps: providing a mold; placing a shielding case in the mold; injecting shock absorbing material into the mold to form a cushion on the shielding case; cooling the molded shielding can; and removing the shielding can from the mold.

4 Claims, 4 Drawing Sheets

SHIELDING CAN AND METHOD FOR MAKING SAME

BACKGROUND

1. Technical field

The present invention relates to shielding cans and a method for making the shielding can, and specifically to an electromagnetic interference (EMI) shielding can that could protect electronic components shielded therein from EMI and shock force and a method for making same.

2. Description of the Related Art

In many portable electronic devices such as mobile phones and personal digital assistants (PDAs), electronic components within one electronic device often interfere with each other by producing electromagnetic signals. To solve this problem, metal enclosures or metal-coated plastic enclosures are often used to package electronic components to avoid interference with other electronic components.

As the popularity of camera phones has increase dramatically over the years, many users find it useful, as they are conveniently portable and multi-functional. A camera phone is a mobile phone that contains a built-in camera module. Similar to other electronic components, a camera module incorporated in a mobile phone should be provided with EMI shielding to protect from EMI radiation. Usually, the camera module is covered by a shielding can to achieve purpose of EMI protection. In addition, the user might accidentally drop the camera phone and cause damages to the camera module within the mobile phone by shock or impact. In order to protect the camera module from damages of shock force or impact, typically, the camera module is mounted with a shock absorbing member made of shock absorbing material, such as rubber, and foam. Generally, shock absorbing member is manually mounted by operators.

Since the shielding can and the shock absorbing member are mounted to the camera module at two workstations, the assembly process becomes time consuming and the cost of production is increased. In addition, manually mounting the shock absorbing member is also time consuming and increases the labor cost as well.

What is needed, therefore, is an improved shielding can and a method for making the shielding can to overcome the above-described shortcomings.

SUMMARY

In one aspect, a shielding can is provided. The shielding can includes a shielding case configured to reduce electromagnetic interference, and a cushion integrally mounted to the shielding case by insert molding. The cushion is configured to absorb shock force.

In another aspect, a method for making the shielding can is provided. The method includes the following steps: providing a mold; placing a shielding case in the mold; injecting shock absorbing material into the mold to form a cushion on the shielding case; cooling the molded shielding can; and removing the shielding can from the mold.

Other advantages and novel features will become more apparent from the following detailed description when taken in conjunction with the accompanying drawings.

BRIEF DESCRIPTION OF THE DRAWINGS

Many aspects of the present shielding can and method for making the shielding can can be better understood with reference to the following drawings. The components in the drawings are not necessarily drawn to scale, the emphasis instead being placed upon clearly illustrating the principles of the shielding can and method for making the shielding can. Moreover, in the drawings, like reference numerals designate corresponding parts throughout the several views.

DETAILED DESCRIPTION OF THE PREFERRED EMBODIMENT

Figure 1:
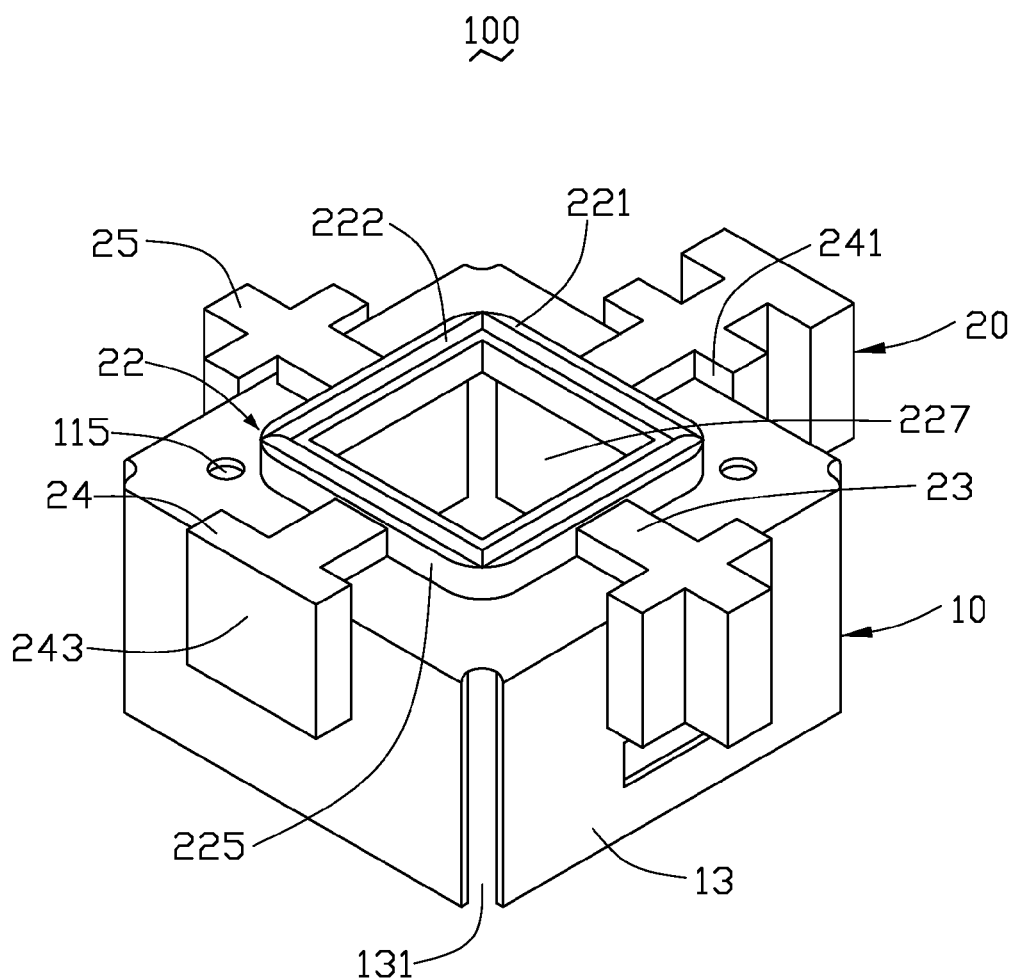
FIG. 1 is a schematic, perspective view of a shielding can according to a present embodiment.

Referring now to the drawings in detail, FIG. 1 schematically shows a shielding can 100 configured to protect a camera module from electromagnetic interference (EMI, also called radio frequency interference, RFI), shock force and pollution of dust. The shielding can 100 includes a shielding case 10 and a cushion 20 integrally formed on the shielding case 10.

Figure 2:
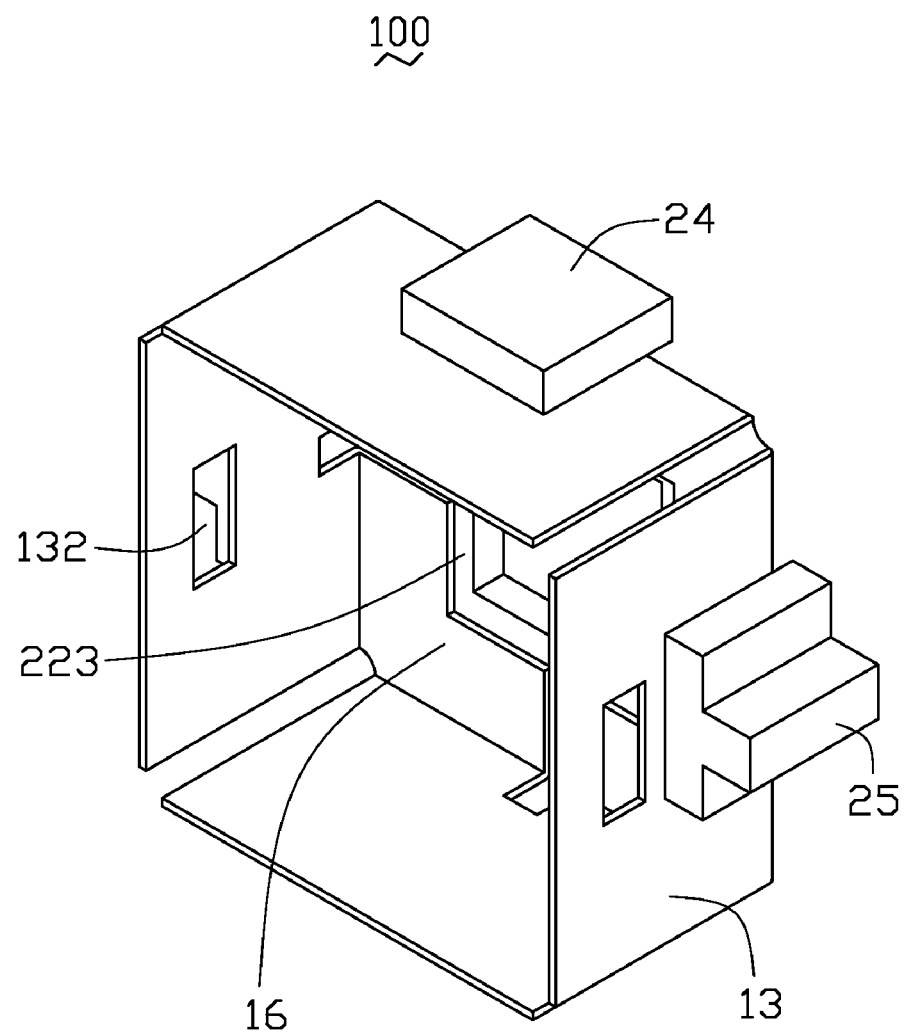
FIG. 2 is similar to FIG. 1, but taken from another aspect.
Figure 3:
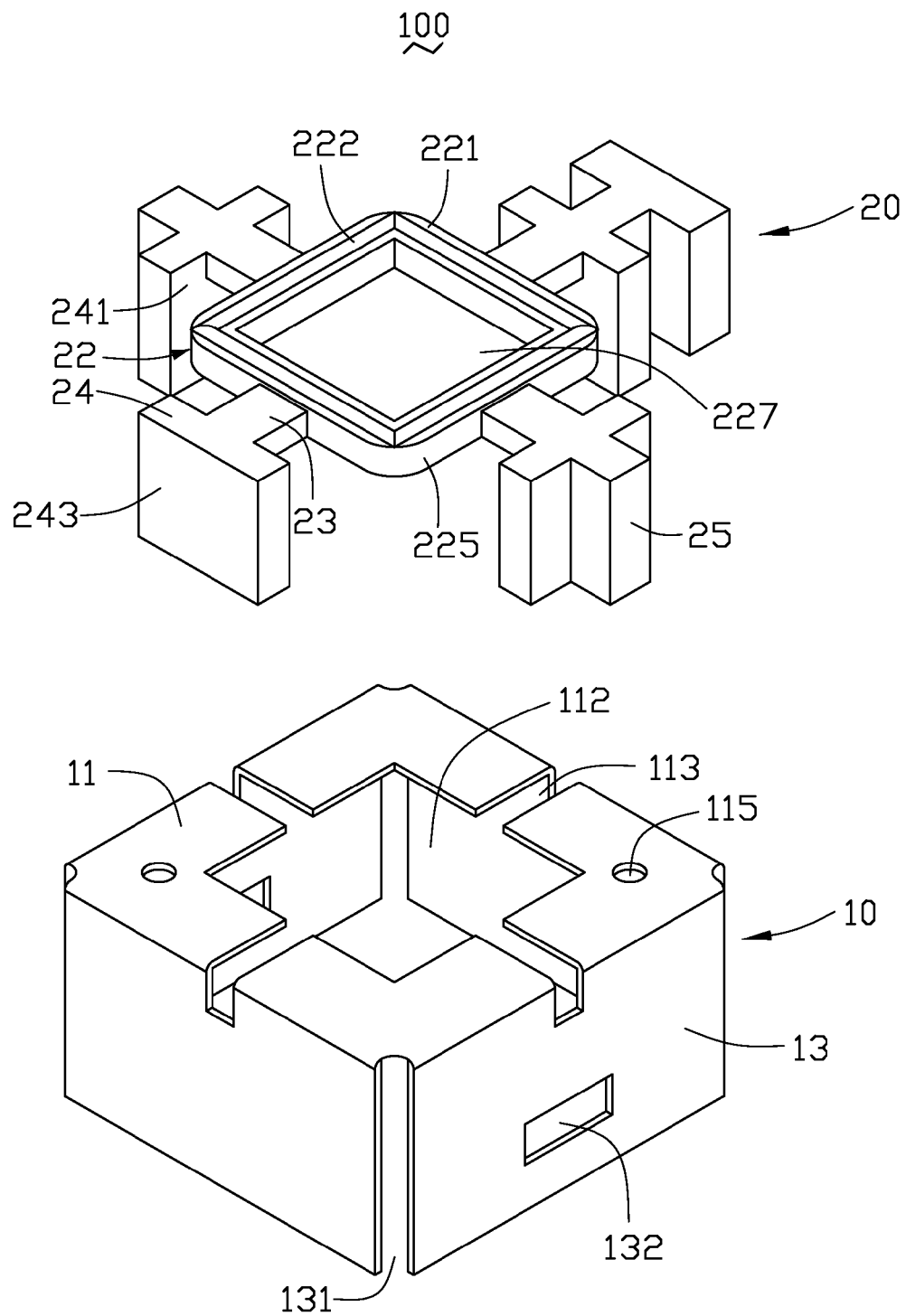
FIG. 3 shows a disassembled view of the shielding can of FIG. 1.
Figure 4:
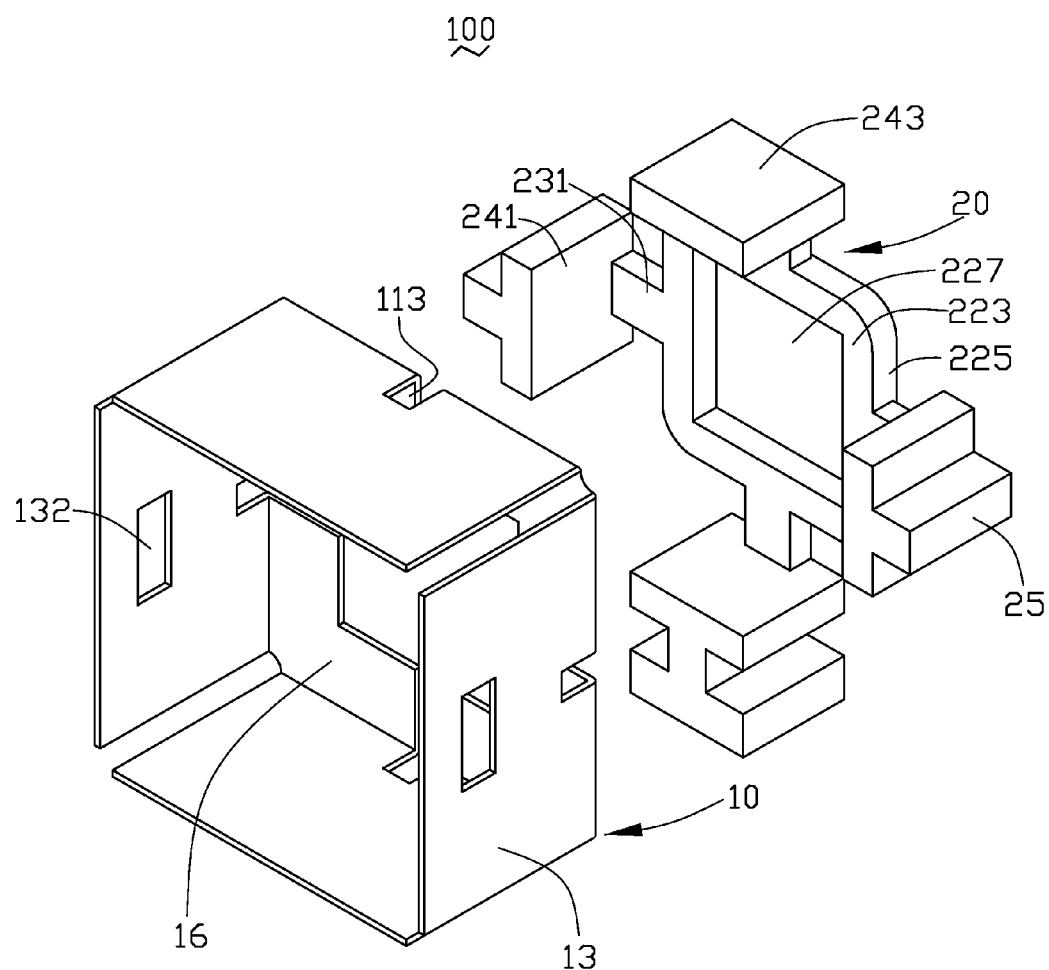
FIG. 4 shows a disassembled view of the shielding can of FIG. 2.

The shielding case 10 is made of conductive material such as metal, or conductive rubber, so as to protect a camera module (not shown) received therein against EMI radiated from other electrical circuits or electronic components and reduces the risk of interfering with other electronic components. As shown in FIGS. 2-4, the shielding case 10 advantageously has a one-piece structure, and includes a rectangular top wall 11, four sidewalls 13 perpendicularly connected with an outer peripheral contour of the top wall 11. The top wall 11 and the sidewalls 13 cooperatively define a cavity 16 therebetween to accommodate a camera module therein. The top wall 11 has a rectangular through hole 112, four slots 113 and a plurality of bores 115 defined therethrough. The through hole 112 is configured to allow light pass therethrough to reach the camera module, and defined in a central portion of the top wall 11, thereby forming a rectangular inner peripheral contour that surrounds the through hole 112. The slots 113 communicate with the through hole 112. Each slot 113 begins from a middle portion of a side of the inner peripheral contour, perpendicularly extends to a corresponding side of the outer peripheral contour and then extends to the sidewalls 13. Adjacent sidewalls 13 are separate from each other, thereby defining a gap 131 therebetween. Two opposite sidewalls 13 have a rectangular opening 132 defined therethrough. The rectangular openings 132 are configured to structurally engage with the camera module received in the shielding case 10.

The cushion 20 is made of shock absorbing material, such as thermoplastic urethane (TPU), polyethylene terephthalate (PET), rubber, or foam. The cushion 20 includes a rectangular frame 22, four beams 23, four support walls 24, and at least one position post 25. The rectangular frame 22 has a top surface 221, a ring 222 disposed on the top surface 221, a bottom surface 223 positioned on the opposite side to the top surface 221, an outer peripheral surface 225 perpendicularly connecting the top surface 221 with the bottom surface 223, and a rectangular hole 227 defined therethrough. The ring 222 protrudes from the top surface 221, around the rectangular hole 227. The rectangular hole 227 penetrates through the top surface 221 and the bottom surface 223 of the frame 22, and corresponds to the through hole 112 of the shielding case 10. Each beam 23 project outward from a middle portion of a corresponding side of the outer peripheral surface 225 and has a bottom surface 231 approximately at a same surface with the bottom surface 223 of the frame 22. Each beam 23 is shaped to cover a corresponding slot 113 defined in the top wall 11 of the shielding case 10. The support walls 24 are generally rectangular board, and are respectively disposed at a distal end of a corresponding beam 23. Each support wall 24 extends perpendicularly to the bottom surface 231 of the beams 23 with adjacent support walls 24 perpendicular to each other. Each support wall 24 has an inner surface 241 configured to be attached on a corresponding sidewall 13, and an outer surface 243 parallel and opposite to the inner surface 241. The position post 25 is preferably disposed on the outer surface 243 of the support wall 24, and configured to structurally engage with a corresponding position structure of the mobile phone.

The cushion 20 is integrally molded on the shielding case 10. The rectangular frame 22 is mounted on the top wall 11 of the shielding case 10 around the through hole 112 with the bottom surface 223 attached to the top wall 11. The bottom surfaces 231 of the beams 23 are attached to the top wall 11 and respectively cover a corresponding slot 113 defined in the top wall 11. The support walls 24 are secured to the sidewalls 13 of the shielding case 10 with the inner surface 241 coving a corresponding slot 113 defined in the sidewall 13. When a camera module received in the shielding can 100 is applied to a mobile phone, the outer surface 243 of the support walls 24 abut against other structures of the mobile phone and the position post 25 engages with position structures of the mobile phone to precisely position the camera module. The ring 222 of the cushion 20 can abut against and attach to a transparent window configured to protect the camera module, thereby acting as a sealing ring to seal the camera module to prevent dust from getting in.

A method for making the shielding can 100 includes the following steps: providing a mold (not shown); placing a shielding case 10 in the mold; injecting shock absorbing material into the mold to form a cushion 20 on the shielding case 10; cooling the molded shielding can 100; and removing the shielding can 100 from the mold.

Understandably, cushion 20 of the shielding can 100 can absorb shocks to minimize damage to the camera module received in the shielding can 100, and protect the camera module from dust pollution. Since the cushion 20 is integrally molded on the shielding case 10, the shielding case 10 and the cushion 20 are mounted to the camera module at the same time. Thus, the assembly process is less time consuming.

It is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. A shielding can comprising:
a shielding case, configured for reducing electromagnetic interference; the shielding case comprising a top wall, a plurality of sidewalls extending from an outer peripheral contour of the top wall, and a cavity defined by the top wall and the sidewalls; and
a cushion integrally molded on the shielding case, the cushion being configured to absorb shock; the cushion comprising a plurality of support walls, the support walls mounted on sidewalls of the shielding case, respectively;
wherein the plurality of sidewalls perpendicularly extend from the outer peripheral contour of the top wall, the sidewalls separate from each other, thereby defining a gap between each of the sidewalls;
wherein the cushion further comprises a frame mounted on the top wall of the shielding case, the support walls extending perpendicularly from an outer peripheral surface of the frame.

2. The shielding can as claimed in claim 1, wherein the top wall has a through hole defined therethrough, and the frame has a hole defined corresponding to the through hole.

3. The shielding can as claimed in claim 2, wherein the top wall further has a plurality of slots defined therethrough, and the slots communicate with the through hole and extend to the sidewalls, the cushion further includes a plurality of beams which connect the frame to the support walls and disposed on the top wall of the shielding case to cover the slots.

4. The shielding can as claimed in claim 1, wherein the cushion further comprises at least one position post disposed on one support wall, and the position post is configured to precisely position the shielding can.

* * * * *